(12) United States Patent
Momosaki

(10) Patent No.: US 7,986,819 B2
(45) Date of Patent: Jul. 26, 2011

(54) ELECTRONIC APPARATUS AND VIDEO DISPLAY METHOD

(75) Inventor: Kohei Momosaki, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 34 days.

(21) Appl. No.: 12/549,849

(22) Filed: Aug. 28, 2009

(65) Prior Publication Data

US 2010/0104145 A1 Apr. 29, 2010

(30) Foreign Application Priority Data

Oct. 24, 2008 (JP) ................................. 2008-274513

(51) Int. Cl.
*G06K 9/00* (2006.01)
(52) U.S. Cl. ...................................................... 382/118
(58) Field of Classification Search .................. 382/115, 382/117, 118; 348/77, 78, 143, 150; 705/1.1, 705/26, 37; 707/999.001, 999.002, 999.009, 707/999.01, 999.2; 709/217, 223; 713/150, 713/155, 170, 175, 176, 180
See application file for complete search history.

(56) References Cited

U.S. PATENT DOCUMENTS

| 7,630,986 B1 * | 12/2009 | Herz et al. ............................. 1/1 |
| 2008/0144890 A1 | 6/2008 | Ogawa |
| 2009/0172032 A1 | 7/2009 | Isobe et al. |
| 2009/0172545 A1 | 7/2009 | Yokoi |
| 2009/0185745 A1 | 7/2009 | Momosaki |

FOREIGN PATENT DOCUMENTS

| JP | 2000-312310 A | 11/2000 |
| JP | 2002-185889 A | 6/2002 |
| JP | 2003-046911 A | 2/2003 |
| JP | 2006-5510240 A | 3/2006 |
| JP | 2007-280325 A | 10/2007 |
| JP | 2007-281680 A | 10/2007 |
| JP | 2008-276707 A | 11/2008 |
| JP | 2009-159507 | 7/2009 |
| JP | 2009-164828 A | 7/2009 |
| JP | 2009-177411 | 8/2009 |
| JP | 2009-182876 A | 8/2009 |
| WO | WO 2004/051656 A1 | 6/2004 |

OTHER PUBLICATIONS

Explanation of Non-English Language References.

(Continued)

*Primary Examiner* — Jose L Couso
(74) *Attorney, Agent, or Firm* — Knobbe Martens Olson & Bear, LLP

(57) ABSTRACT

According to one embodiment, an electronic apparatus includes an indexing module, an image display processing module, a playback processing module, and a emphasizing processing module. The indexing module extracts face images which appear in a sequence of moving image data, and outputs time stamp information indicating a timing of appearance of each of the extracted face images. The image display processing module displays the extracted face images on a first display area. The playback processing module plays back the moving image data and displays the moving image data on a second display area. The emphasizing processing module emphasizes, when the moving image data is played back, a face image on the first display area, which appears within a predetermined period corresponding to a present playback position of the moving image data, based on the time stamp information corresponding to each face image which belongs to the extracted face images.

8 Claims, 13 Drawing Sheets

OTHER PUBLICATIONS

The Final Notice of Rejection for Japanese Patent Application No. 2008-274513 mailed by the Japan Patent Office on Jan. 26, 2010 along with an English translation thereof and Statement of Accuracy of Translation in five (5) pages.

Notice of Reasons for Rejection mailed by Japan Patent Office on Oct. 27, 2009 in the corresponding Japanese patent application No. 2008-274513.

* cited by examiner

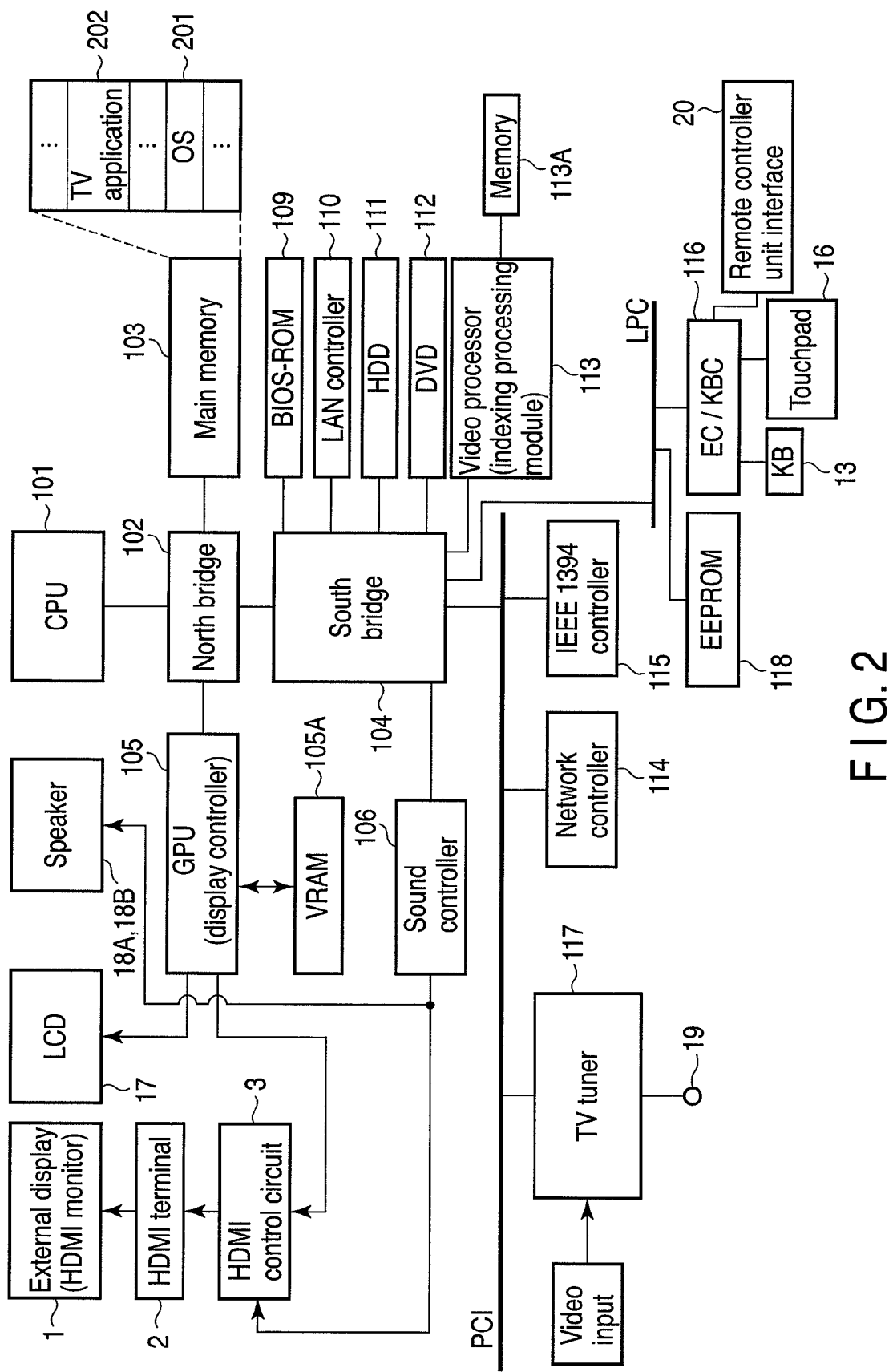
F I G. 2

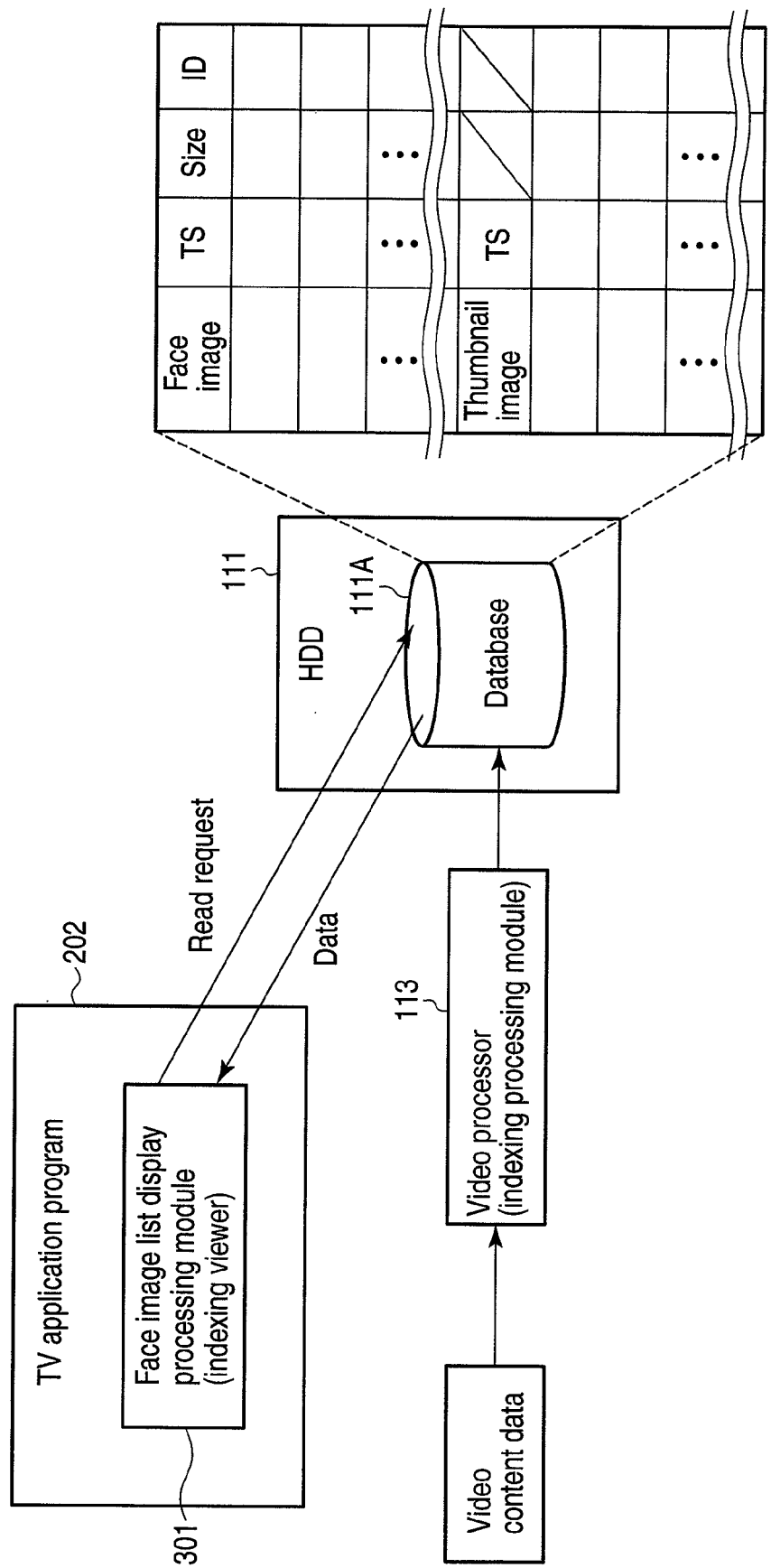
F I G. 3

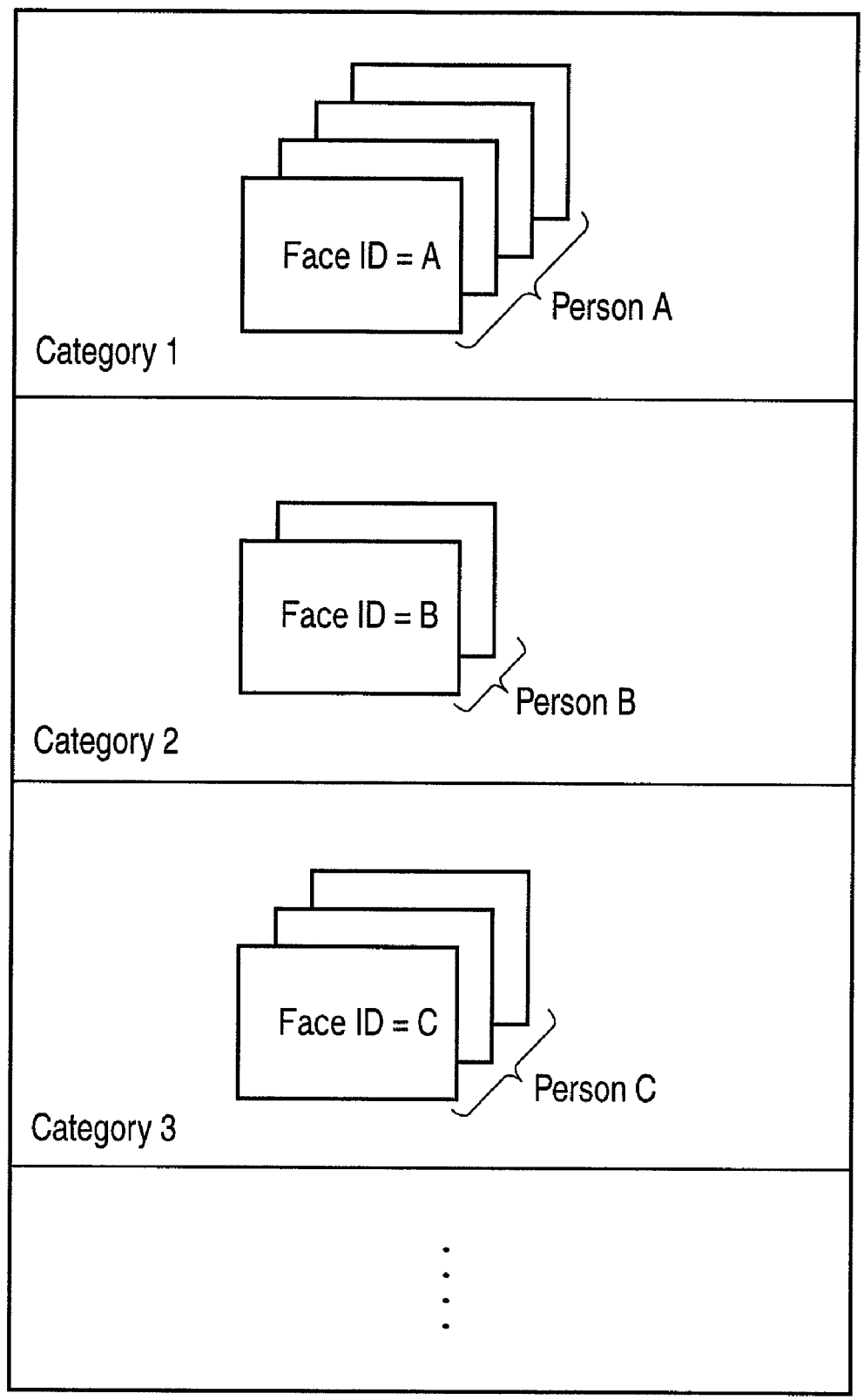
F I G. 4

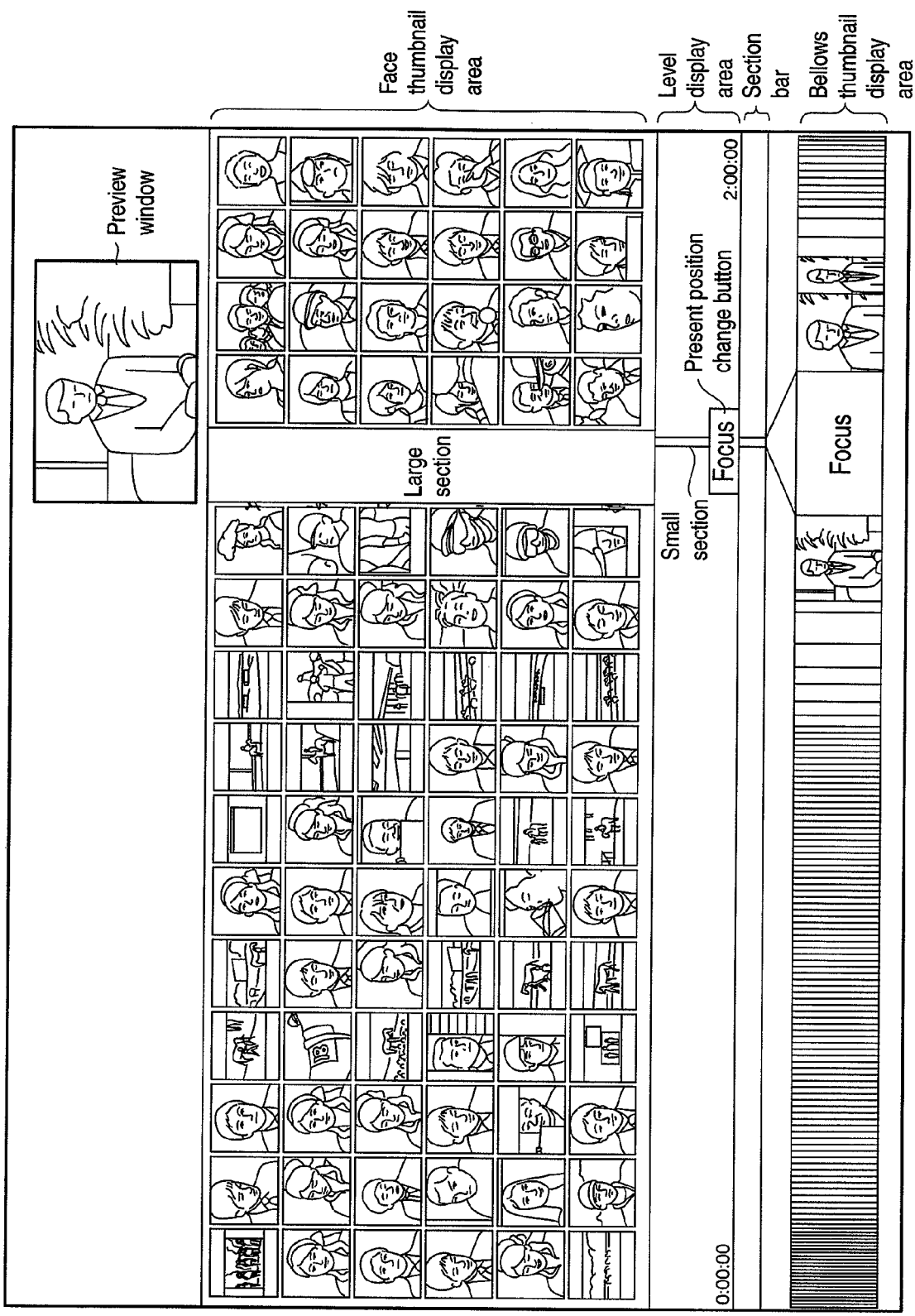
F I G. 6

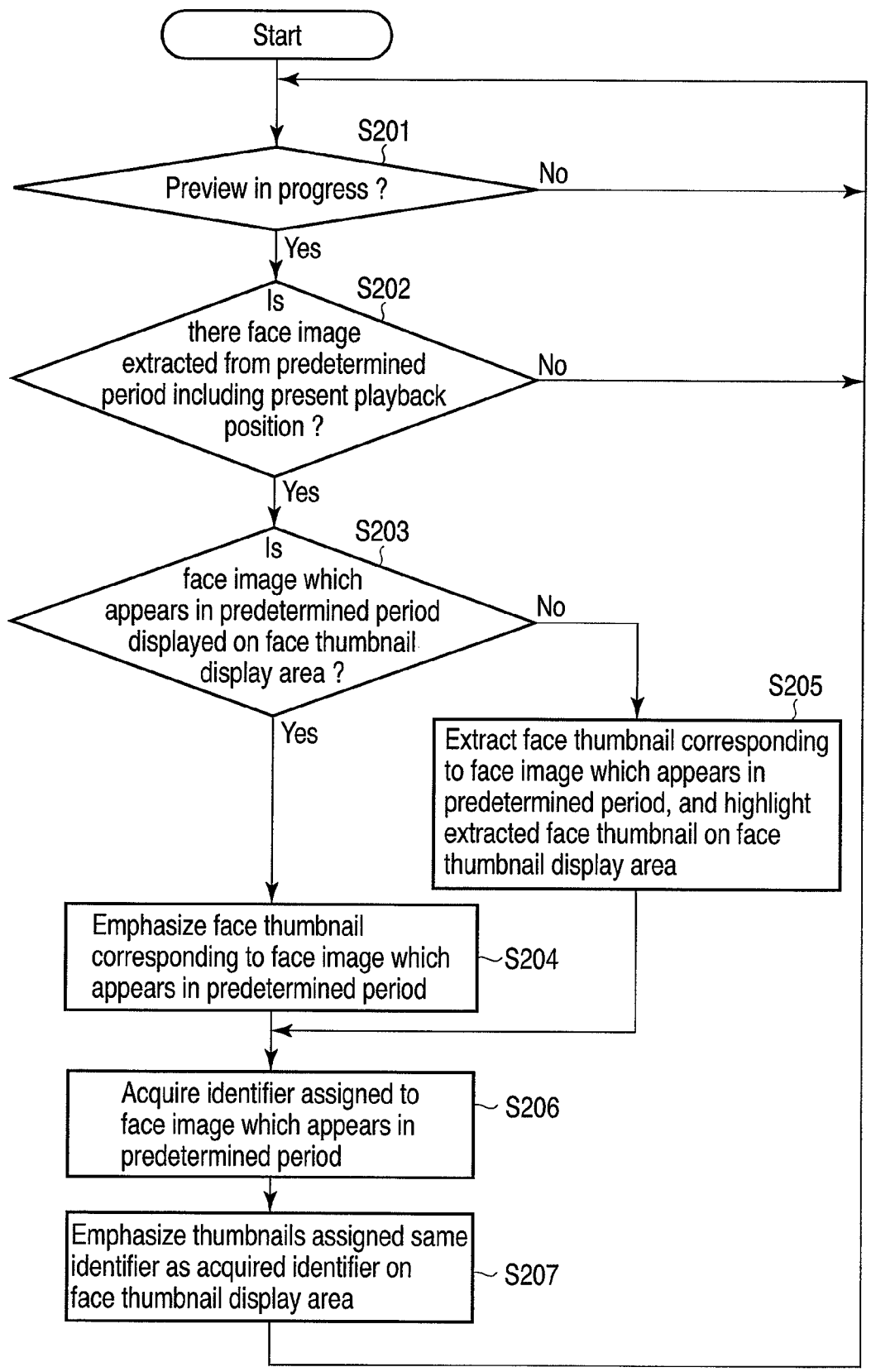
F I G. 13

ELECTRONIC APPARATUS AND VIDEO DISPLAY METHOD

CROSS-REFERENCE TO RELATED APPLICATIONS

This application is based upon and claims the benefit of priority from Japanese Patent Application No. 2008-274513, filed Oct. 24, 2008, the entire contents of which are incorporated herein by reference.

BACKGROUND

1. Field

One embodiment of the invention relates to an electronic apparatus and video display method, which display an overview of moving image data included in video content data.

2. Description of the Related Art

In general, electronic apparatuses such as a video recorder and personal computer can record and play back various video content data like television broadcast program data. In this case, title names are appended to respective video content data stored in an electronic apparatus. However, it is difficult for the user to recognize the content of respective video content data based only on the title names. For this reason, in order to recognize the content of video content data, that video content data has to be played back. However, playback of video content data of long total duration requires much time even when a fast-forwarding playback function or the like is used.

Hence, recently, a technique for displaying a list of thumbnail images respectively corresponding to some still images extracted from video content data has begun to be developed.

Jpn. Pat. Appln. KOKAI Publication No. 2003-46911 discloses a monitor recording apparatus which can search for persons. This apparatus has a function of extracting face images from video data, and displaying a list of extracted face images.

A list display of thumbnail images is effective as a technique for presenting an overview of video content data to the user. Also, conventionally, a preview function that simply plays back, e.g., a designated part in video content is known. However, in the normal preview function, since a preview playback process and a display process of a thumbnail display area are independently made, it is difficult for the user to recognize to which thumbnail image on the thumbnail display area the currently preview-playback part corresponds.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing an example of the system arrangement of the electronic apparatus according to the embodiment;

FIG. 3 is an exemplary block diagram for explaining a face image list display function of the electronic apparatus according to the embodiment;

FIG. 4 is an exemplary view showing an example of face image groups used in the electronic apparatus according to the embodiment;

FIG. 6 is an exemplary view showing an example of an indexing view screen displayed on a display device by the electronic apparatus according to the embodiment;

FIG. 13 is an exemplary flowchart showing an example of the procedures of a face image display process accompanied by a preview playback process executed by the electronic apparatus according to the embodiment.

DETAILED DESCRIPTION

Figure 1:
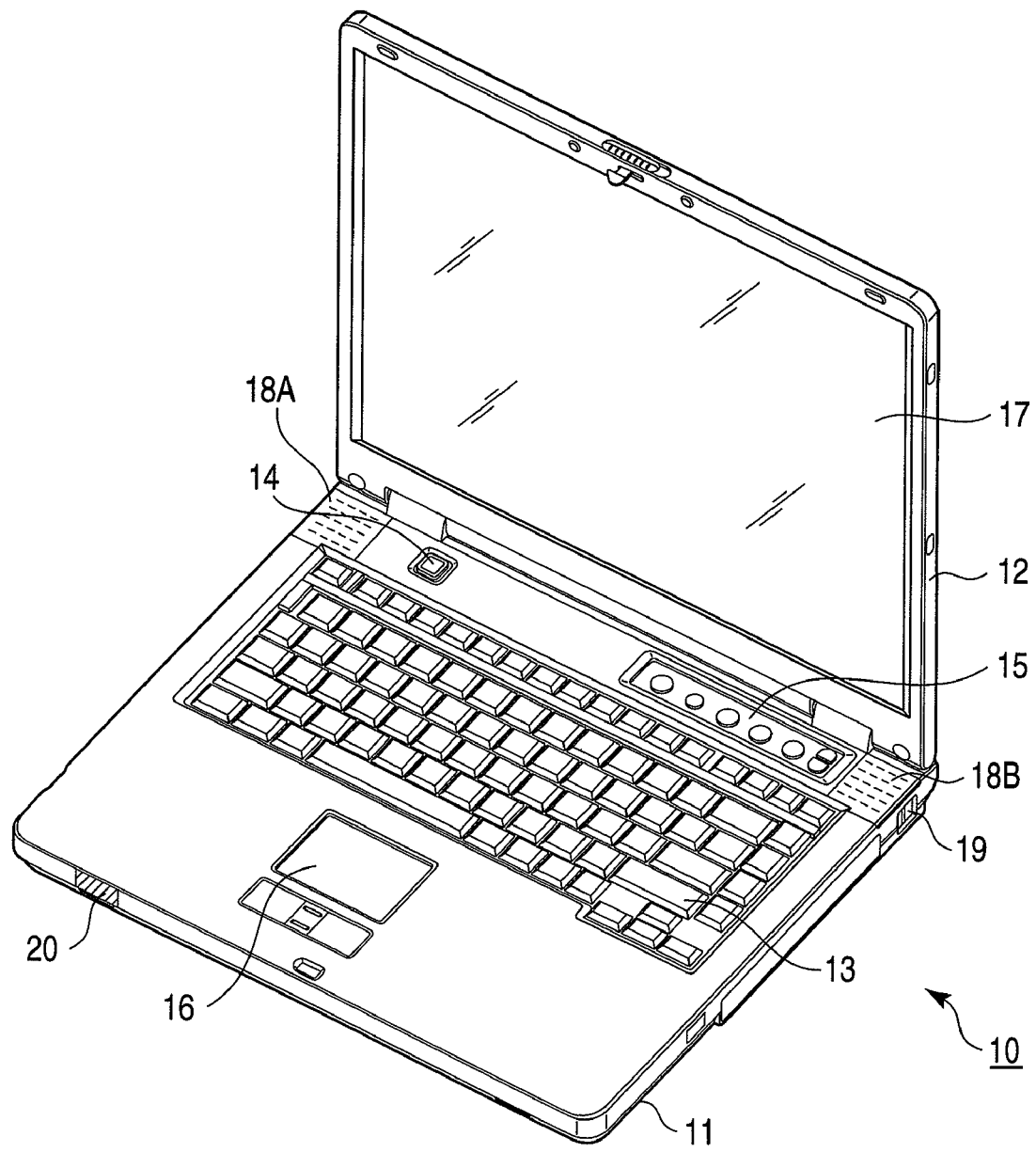
FIG. 1 is an exemplary perspective view showing an example of the outer appearance of an electronic apparatus according to an embodiment of the invention.

Various embodiments according to the invention will be described hereinafter with reference to the accompanying drawings. In general, according to one embodiment of the invention, there is provided an electronic apparatus comprising: an indexing module configured to extract face images which appear in a sequence of moving image data in video content data, and to output time stamp information indicating a timing of appearance of each of the extracted face images on the sequence of the moving image data; an image display processing module configured to display a list of the extracted face images on a first display area on a display screen; a playback processing module configured to play back the moving image data and to display the moving image data on a second display area on the display screen; and a emphasizing processing module configured to display, when the moving image data is played back on the second display area, a face image on the first display area with emphasis, which appears within a predetermined period corresponding to a present playback position of the moving image data, based on the time stamp information corresponding to each face image which belongs to the extracted face images.

The arrangement of an electronic apparatus according to an embodiment of the invention will be described first with reference to FIGS. 1 and 2. The electronic apparatus of this embodiment is implemented as, for example, a notebook personal computer 10 serving as an information processing apparatus.

This personal computer 10 can record and play back video content data (audio/visual content data) such as broadcast program data and video data input from an external apparatus. More specifically, the personal computer 10 has a television (TV) function of executing viewing and recording of broadcast program data broadcast by a TV broadcast signal. This TV function is implemented by, for example, a TV application program installed in advance in the personal computer 10. Also, the TV function has a function of recording video data input from an external AV apparatus and a function of playing back the recorded video data and recorded broadcast program data.

Furthermore, the personal computer 10 has a thumbnail image display function of displaying a list of still images extracted from moving image data included in video content data. This thumbnail image display function is implemented as, for example, one function in the TV function. This thumbnail image display function is one of video indexing functions required to present overviews and the like of video content data to the user. This thumbnail image display function can present an overview of the entire video content data to the user.

The personal computer 10 also has a preview function of (simply) playing back moving image data included in video content data using a display area used by this thumbnail image display function.

Moreover, the thumbnail image display function also has a face image list display function of displaying a list of face images of persons who appear in video content data. This face image list display function is also one of the aforementioned video indexing functions. This face image list display function can present, to the user, the relationship between persons and time zones in which those persons appear of the entire video content data. This face image list display function can also display a list of persons by focusing attention on a predetermined attribute section included in video content data.

FIG. 1 is a perspective view of a state in which a display unit of the computer 10 is opened. This computer 10 includes a computer main body 11 and display unit 12. In the display unit 12, a display device including a TFT-LCD (Thin Film Transistor Liquid Crystal Display) 17 is built.

The display unit 12 is attached to the computer main body 11 to be pivotal between an open position where the upper face of the computer main body 11 is exposed and a close position where the display unit 12 covers the upper face of the computer main body 11. The computer main body 11 has a low-profile, box-shaped housing, on the upper face of which a keyboard 13, a power button 14 used to turn on/off the power supply of the computer 10, an input operation panel 15, a touchpad 16, and speakers 18A and 18B are arranged.

The input operation panel 15 is an input apparatus used to input an event corresponding to a pressed button, and includes a plurality of buttons used to launch a plurality of functions. These buttons include operation buttons used to control a TV function (viewing, recording, and playback of recorded broadcast program data/video data). A remote controller unit interface module 20 for implementing communications with a remote controller unit used to remotely control the TV function of this computer 10 is provided to the front face of the computer main body 11. The remote controller unit interface module 20 includes an infrared ray signal receiving module and the like.

A TV broadcast antenna terminal 19 is provided to, e.g., the right side face of the computer main body 11. An external display connection terminal complying with, e.g., the HDMI (High-Definition Multimedia Interface) specification is arranged on, e.g., the back face of the computer main body 11. This external display connection terminal is used to output video data (moving image data) included in video content data such as broadcast program data to an external display.

The system arrangement of the computer 10 will be described below with reference to FIG. 2.

As shown in FIG. 2, the computer 10 includes a CPU 101, north bridge 102, main memory 103, south bridge 104, graphics processing unit (GPU) 105, video memory (VRAM) 105A, sound controller 106, BIOS-ROM 109, LAN controller 110, hard disk drive (HDD) 111, DVD drive 112, video processor 113, memory 113A, network controller 114, IEEE 1394 controller 115, embedded controller/keyboard controller IC (EC/KBC) 116, TV tuner 117, and EEPROM 118.

The CPU 101 is a processor which controls the operations of the computer 10, and executes an operating system (OS) 201 and various application programs such as a TV application program 202, which are loaded from the hard disk drive (HDD) 111 onto the main memory 103. This TV application program 202 is software for executing the TV function. The TV application program 202 executes a live playback process that allows the user to view broadcast program data received by the TV tuner 117, a video recording process for recording received broadcast program data in the HDD 111, a playback process for playing back broadcast program data/video data recorded in the HDD 111, and the like. The CPU 101 also executes a basic input/output system (BIOS) stored in the BIOS-ROM 109. The BIOS is a program required for hardware control.

The north bridge 102 is a bridge device that connects between a local bus of the CPU 101 and the south bridge 104. The north bridge 102 incorporates a memory controller that executes access control of the main memory 103. Also, the north bridge 102 has a function of executing communications with the GPU 105 via a serial bus complying with the PCI EXPRESS specification.

The GPU 105 is a display controller which controls the LCD 17 used as a display monitor of the computer 10. A display signal generated by this GPU 105 is supplied to the LCD 17. The GPU 105 can output a digital video signal to an external display device 1 via an HDMI control circuit 3 and HDMI terminal 2.

The HDMI terminal 2 is the aforementioned external display connection terminal. The HDMI terminal 2 can output an uncompressed digital video signal and digital audio signal to the external display device 1 such as a television via a single cable. The HDMI control circuit 3 is an interface used to output a digital video signal to the external display device 1 called an HDMI monitor via the HDMI terminal 2.

The south bridge 104 controls respective devices on a Low Pin Count (LPC) bus and those on a Peripheral Component Interconnect (PCI) bus. The south bridge 104 incorporates an Integrated Drive Electronics (IDE) controller required to control the hard disk drive (HDD) 111 and DVD drive 112. Furthermore, the south bridge 104 also has a function of executing communications with the sound controller 106.

To the south bridge 104, the video processor 113 is connected via, e.g., a serial bus complying with the PCI EXPRESS specification.

The video processor 113 executes various processes associated with the aforementioned video indexing. The video processor 113 serves as an indexing processing module for executing a video indexing process. More specifically, in the video indexing process, the video processor 113 executes a thumbnail image extraction process. In the thumbnail image extraction process, the video processor 113 extracts a still image of at least one frame from each of sections that define a sequence of moving image data included in video content data. The sections have equal durations. Of course, these sections need not always have equal durations. For example, when moving image data is compression-encoded, only an I (intra) picture as intra-frame encoded picture may be extracted from the compression-encoded moving image data. The video processor 113 can also detect clips or scenes of moving image data, and can extract a still image of at least one frame from each of the detected clips or scenes.

In the video indexing process, a face image extraction process is also executed. In this face image extraction process, the video processor 113 extracts face images from moving image data included in video content data. Face images are extracted by, for example, a face detection process for detecting a face region from each frame of moving image data, and a clipping process for clipping the detected face region from the frame. A face region can be detected by analyzing a feature of an image of each frame, and searching for a region having the feature similar to a face image feature sample prepared in advance. The face image feature sample is feature data calculated by statistically processing face image features of a large number of persons.

Furthermore, the video processor 113 also executes, for example, a process for detecting commercial sections included in video content data, and an audio indexing process. Normally, the duration of each commercial section is set to be one of some predetermined durations. Silent sections each having a given duration exist before and after each commercial section. Therefore, in the commercial section detection process, for example, audio data included in video content data is analyzed to detect a silent section having a given duration. Then, a section which is sandwiched between the two successive detected silent sections and includes partial data having a duration of a given value or more is detected as a commercial section.

The audio indexing process is an indexing process that analyzes audio data included in video content data to detect a music section in which music is playing and a speech section in which persons are speaking, which sections are included in the video content data. In the audio indexing process, for example, features of a frequency spectrum of audio data are analyzed, and the music section and speech section are detected according to the features of the frequency spectrum. Since the feature of the frequency spectrum corresponding to the music section is different from that of the frequency spectrum corresponding to the speech section, the music section and speech section can be detected respectively by analyzing the features of the frequency spectrum. A section having the frequency spectrum as a mixture of the feature of the frequency spectrum corresponding to the music section and that of the frequency spectrum corresponding to the speech section can be detected as an overlapping section in which the music section and speech section overlap.

In the detection process of the speech section, for example, a speaker segmentation technique or speaker clustering technique is used, and switching of speakers is also detected by that technique. A period in which a single speaker (or an identical speaker group) is continuously speaking is detected as one speech section.

Furthermore, the audio indexing process executes a cheer level detection process for detecting a cheer level for each partial data (data having a given duration) in video content data, and an excitement level detection process for detecting an excitement level for each partial data in video content data.

The cheer level indicates the magnitude of cheers. The cheer is a sound defined by combining voices of a lot of people. The sound defined by combining voices of a lot of people has a specific frequency spectrum distribution. In the cheer level detection process, the frequency spectrum of audio data included in video content data is analyzed, and the cheer level of each partial data is detected according to the analysis result of the frequency spectrum. The excitement level is a tone volume level of a section in which a given tone volume level or more is continuously generated over a given duration or longer. For example, the tone volume level of a sound like relatively vigorous applause or roar is the excitement level. In the excitement level detection process, the tone volume distribution of audio data included in video content data is analyzed, and the excitement level of each partial data is detected according to the analysis result.

The memory 113A is used as a work memory of the video processor 113. In order to execute the indexing process (video indexing process, commercial detection process, and audio indexing process), a large calculation cost is required. In this embodiment, the video processor 113 as a dedicated processor different from the CPU 101 is used as a backend processor, and executes the indexing process. Hence, the indexing process can be executed without increasing the load on the CPU 101. Note that the commercial detection process can be executed by analyzing audio data, as described above. Hence, in the following description, the commercial detection process is handled as one process in the audio indexing process.

The sound controller 106 is a sound source device, which outputs audio data to be played back to the speakers 18A and 18B or the HDMI control circuit 3.

The network controller 114 is a wireless communication device which executes wireless communications complying with, e.g., the IEEE 802.11 specification. The IEEE 1394 controller 115 executes communications with an external apparatus via a serial bus complying with the IEEE 1394 specification.

The embedded controller/keyboard controller IC (EC/KBC) 116 is a one-chip microcomputer, which integrates an embedded controller for power management, and a keyboard controller for controlling the keyboard (KB) 13 and touchpad 16. The embedded controller/keyboard controller IC (EC/KBC) 116 has a function of turning on/off the power supply of the computer 10 in response to a user's operation of the power button 14. Furthermore, the embedded controller/keyboard controller IC (EC/KBC) 116 has a function of executing communications with the remote controller unit interface 20.

The TV tuner 117 is a receiving apparatus which receives broadcast program data broadcast by a television (TV) broadcast signal, and is connected to the antenna terminal 19. This TV tuner 117 is implemented as a digital TV tuner which can receive digital broadcast program data such as terrestrial digital TV broadcast. The TV tuner 117 also has a function of capturing video data input from an external apparatus.

The thumbnail image display function of this embodiment will be described below with reference to FIG. 3.

The indexing process (video indexing process and audio indexing process) for video content data such as broadcast program data is executed by the video processor 113 which serves as the indexing processing module, as described above.

The video processor 113 executes the indexing process for, e.g., video content data such as recorded broadcast program data designated by the user under the control of the TV application program 202. The video processor 113 can also execute the indexing process for broadcast program data parallel to a video recording process for storing the broadcast program data received by the TV tuner 117 in the HDD 111.

In the video indexing process, the video processor 113 executes a thumbnail image extraction process. A thumbnail image is a still image (downscaled image) corresponding to each of frames extracted from sections that define moving image data in video content data. That is, the video processor 113 extracts one or more frames for each section of moving image data, and outputs an image (thumbnail image) corresponding to each extracted frame and time stamp information TS indicating the timing of appearance of the thumbnail image. Thumbnail extraction result data (thumbnail image and time stamp information TS) output from the video processor 113 is stored in a database 111A as thumbnail indexing information. This database 111A is a storage area for storing indexing data, which is allocated in the HDD 111.

As time stamp information corresponding to each thumbnail image, an elapsed time from the beginning of video content data until the frame of the thumbnail image appears, a frame number of the frame of the thumbnail image, or the like can be used.

Furthermore, in the video indexing process, the video processor 113 also executes a process for extracting face images. The video processor 113 analyzes moving image data included in video content data for respective frames. The video processor 113 then extracts a face image of a person from each of frames that define moving image data, and outputs time stamp information indicating the timing of appearance of each extracted face image in the moving image data. That is, the video processor 113 outputs face images and time stamp information corresponding to each face image.

Moreover, the video processor 113 outputs a size (resolution) of each extracted face image. Face detection result data (a face image, time stamp information TS, and a size) output from the video processor 113 is stored in the database 111A as face image indexing information.

In the audio indexing process, the video processor 113 analyzes audio data included in video content data to detect types of attribute sections (commercial section, music section, and speech section) included in the video content data, and outputs section attribute information indicating the start and end timings of each detected attribute section. This section attribute information is stored in the database 111A as attribute detection result information. Furthermore, in the audio indexing process, the video processor 113 also executes the cheer level detection process and excitement level detection process. The results of these cheer level detection process and excitement level detection process are also stored in the database 111A as a part of the aforementioned attribute detection result information.

As shown in FIG. 3, the TV application program 202 includes a face image list display processing module 301 required to execute a thumbnail image display function. This face image list display processing module 301 is implemented as, for example, an indexing viewer program, and displays an indexing view screen that allows the user to grasp an overview of video content data using indexing information (face image indexing information, thumbnail indexing information, section attribute information, etc.) stored in the database 111A.

More specifically, the face image list display processing module 301 reads out thumbnail indexing information (thumbnail images and corresponding pieces of time stamp information TS) from the database 111A, and displays, using the thumbnail indexing information, thumbnail images on a thumbnail display area (to be referred to as a bellows thumbnail display area hereinafter) by laying them out in a line in chronological order.

Also, the face image list display processing module 301 reads out face image indexing information (face images, corresponding pieces of time stamp information TS, and sizes) from the database 111A, and displays a list of face images of persons who appear in video content data on a two-dimensional display area (to be referred to as a face thumbnail display area hereinafter) on the indexing view screen using the face image indexing information.

The two-dimensional face thumbnail display area includes a plurality of face image display areas laid out in a matrix that includes rows and columns. To the columns, time zones that define the total duration of video content data are respectively assigned. More specifically, for example, time zones, which are obtained by equally dividing the total duration of the video content data by the number of the columns, and each of which has an equal duration, are respectively assigned to the columns. Of course, the time zones assigned to the respective columns need not always have equal durations.

The face image list display processing module 301 displays face images which belong to the time zone assigned to each column by laying them out in, e.g., the order of appearance time or frequency of appearance of these face images on face image display areas as many as the number of rows which belong to that column, based on pieces of time stamp information TS corresponding to the face images. In this case, face images as many as the number of rows in the order of frequency of appearance are selected from those which belong to the time zone assigned to each column, and the selected face images are laid out from top down in the order of appearance time. Of course, face images which appear in the time zone assigned to each column may be laid out in the order of frequency of appearance and may be displayed in place of the order of appearance time.

The bellows thumbnail display area can present an overview of the overall video content data to the user, and the face thumbnail display area can present the relationship between time zones in the entire video content data and persons who appear in these time zones to the user in an easily understood manner. Detailed configuration examples of the bellows thumbnail display area and face thumbnail display area will be described later using FIG. 6 and subsequent drawings.

Furthermore, the face image list display processing module 301 reads section attribute information (commercial section attribute information, music section attribute information, and speech section attribute information) from the database 111A, and displays a section bar including bar regions each of which indicates the position (a section from the start timing to the end timing) of each attribute section (commercial section, music section, or speech section) in a sequence from the start position to the end position of video content data on the indexing view screen in accordance with the read section attribute information. This section bar includes, for example, three sub-section bars, i.e., a commercial section bar indicating the position of a commercial section, a music section bar indicating the position of a music section, and a speech section bar indicating the position of a speech section.

When a sequence includes commercial sections, bar regions indicating the positions of the commercial sections are displayed in the commercial section bar. Likewise, when a sequence includes music sections, bar regions indicating the positions of the music sections are displayed in the music section bar. Also, when a sequence includes speech sections, bar regions indicating the positions of the speech sections are displayed in the speech section bar. In the following description, each of commercial sections which decentrally exist in the sequence will be referred to as a partial commercial section, each of music sections which decentrally exist in the sequence will be referred to as a partial music section, and each of speech sections which decentrally exist in the sequence will be referred to as a partial speech section.

By displaying the section bar on the indexing view screen, the relationship between respective face images in the face thumbnail display area and thumbnail images in the bellows thumbnail display area, and attribute sections (commercial section, music section, and speech section) in which these images appear can be presented to the user. Therefore, the user can grasp an overview of the entire video content data also in consideration of section attributes.

Moreover, the face image list display processing module 301 reads cheer level information and excitement level information from the database 111A, and displays, on the indexing view screen, a graph indicating a change in cheer level and that in excitement level in a sequence from the start position to the end position of video content data in accordance with these cheer level information and excitement level information.

This level display area can present the position of a section with loud cheers and that of a section with a lot of excitement in video content data to the user. The user can find out a data position where playback is to start from the entire video content data in consideration of face images, thumbnail images, section attributes, cheer levels, and excitement levels.

FIG. 4 shows the relationship between some face image groups obtained by classifying face images by the face image classification process and IDs (face IDs) corresponding to respective face image groups.

The video processor 113 executes the face image classification process for classifying face images corresponding to an identical person to an identical category based on the correlation of feature data between face images extracted from moving image data of certain video content data. In the face image classification process, face images having similar features are classified into an identical category (identical face image group). As shown in FIG. 4, an identical ID (face ID) is assigned to face images corresponding to an identical person. In FIG. 4, category 1 indicates a set of face images of certain person A, category 2 indicates a set of face images of certain person B, and category 3 indicates a set of face images of certain person C. An ID (face ID=A) used to identify person A is associated with the face images which belong to category 1. An ID (face ID=B) used to identify person B is associated with the face images which belong to category 2. An ID (face ID=C) used to identify person C is associated with the face images which belong to category 3.

Figure 5:
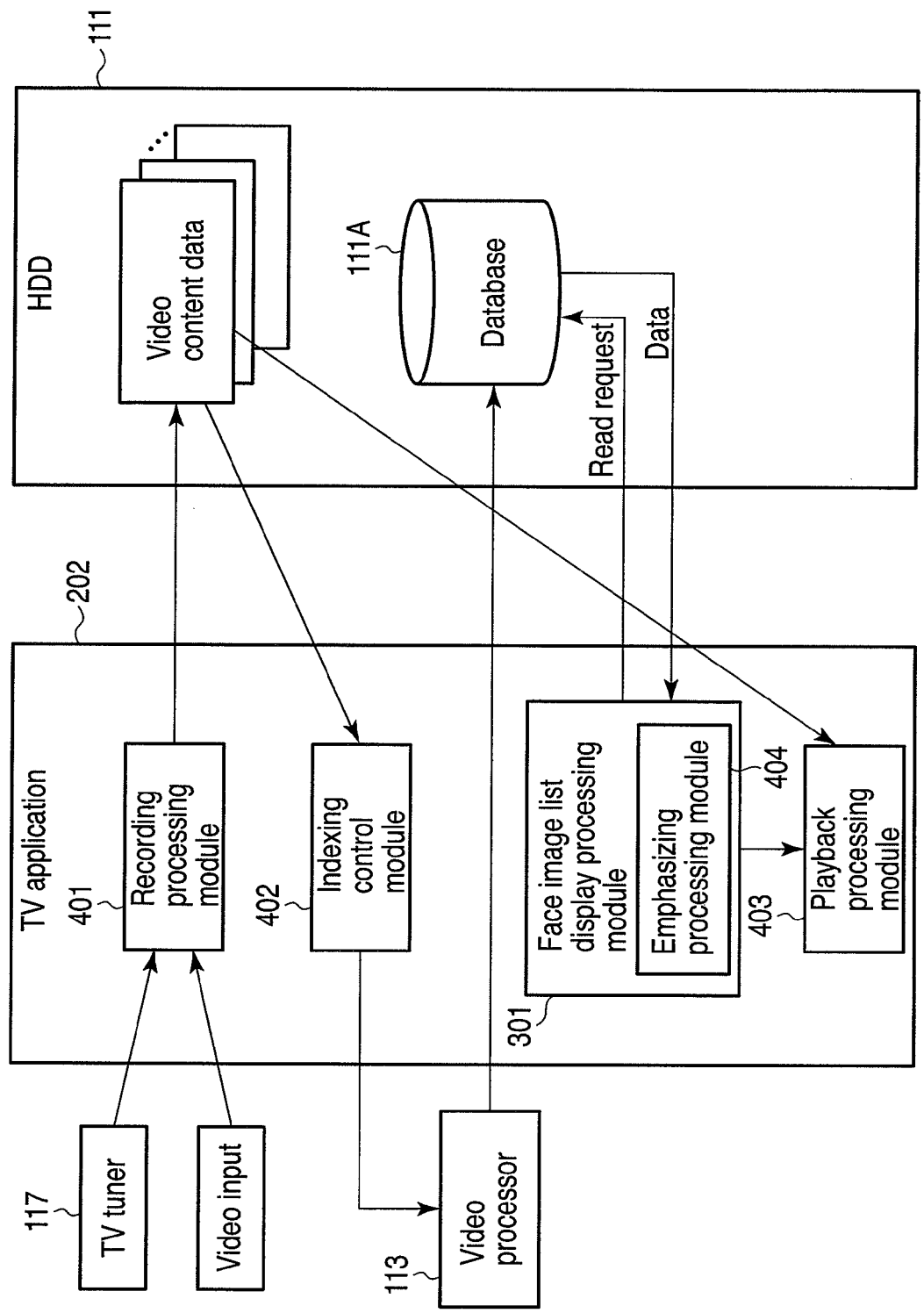
FIG. 5 is an exemplary block diagram showing the functional arrangement of a program used in the electronic apparatus according to the embodiment.

The functional arrangement of the TV application program 202 which cooperates with the indexing viewer program will be described below with reference to FIG. 5.

The TV application program 202 includes a recording processing module 401, indexing control module 402, playback processing module 403, and emphasizing processing module 404 in addition to the aforementioned face image list display processing module 301. The face image list display processing module 301, indexing control module 402, playback processing module 403, and emphasizing processing module 404 can be implemented by the indexing viewer program.

The recording processing module 401 executes a recording process for recording broadcast program data received by the TV tuner 117 or video data input from an external apparatus in the HDD 111. The recording processing module 401 also executes a scheduled video recording process for receiving broadcast program data designated by recording schedule information (a channel number, and date and time), which is set in advance by the user, using the TV tuner 117, and recording that broadcast program data in the HDD 111.

The indexing control module 402 controls the video processor (indexing processing module) 113 to execute the indexing process (video indexing process and audio indexing process). The user can designate whether or not to execute the indexing process for each broadcast program data to be recorded. For example, as for broadcast program data to be recorded for which the indexing process is designated to be executed, after the broadcast program data is recorded in the HDD 111, the indexing process automatically starts. The user can also designate video content data for which the indexing process is to be executed from those stored in the HDD 111.

The playback processing module 403 executes a process for playing back each video content data stored in the HDD 111 on the indexing view screen. The playback processing module 403 has a function of starting, when the user inputs a playback instruction event while one face image in the face image list of certain video content data is selected, playback of the video content data from a timing a predetermined time before the appearance timing of the selected face image.

The emphasizing processing module 404 displays a face image corresponding to the present playback position of video content data in the face image list with emphasis when the playback processing module 403 plays back the video content data, and displays a video frame which is being played back on the indexing view screen. Note that the emphasizing processing module 404 can be implemented as a part of the face image list display processing module 301.

The indexing process need not always be executed by the video processor 113. For example, the TV application program 202 may have a function of executing the indexing process. In this case, the CPU 101 executes the indexing process under the control of the indexing viewer program or the TV application program 202.

A detailed configuration of the indexing view screen will be described below with reference to FIGS. 6 and 7.

FIG. 6 shows an example of the indexing view screen displayed on the LCD 17 by the face image list display processing module 301. This indexing view screen is generated by applying the indexing process to certain video content data (e.g., broadcast program data). This indexing view screen includes a preview window for playing back and displaying video content data, the aforementioned face thumbnail display area for displaying the face image list, the aforementioned level display area, the aforementioned section bar, and the aforementioned bellows thumbnail display area for displaying the list of thumbnail images in a bellows format.

Note that the bellows format is a display format which displays the selected thumbnail image to have a normal size, and remaining thumbnail images while reducing their widthwise sizes.

That is, the face image list display processing module 301 displays a thumbnail image selected by a user's operation to have a first widthwise size, and other thumbnail images to have widthwise sizes smaller than the first widthwise size. In FIG. 6, thumbnail images which have larger distances from the selected thumbnail image have smaller widthwise sizes. That is, the selected thumbnail image is displayed to have the normal size, those which neighbor the selected thumbnail image are displayed to have reduced widths, and remaining thumbnail images are displayed to have slight widths. For the selected thumbnail image, a rectangular frame may be further added.

By a user's operation (buttons, cursor keys, and the like on a remote controller unit), arbitrary one of thumbnail images on the bellows thumbnail display area can be selected.

The level display area displays a graph that indicates a change in cheer level and that in excitement level.

The section bar includes the speech section bar, music section bar, and commercial section bar. In the commercial section bar, bar regions are displayed at the positions of respective commercial sections (partial commercial sections). In the music section bar, bar regions are displayed at the positions of respective music sections (partial music sections). In the speech section bar, bar regions are displayed at the positions of respective speech sections (partial speech sections). The user can select one of the speech section bar, music section bar, and commercial section bar by operating buttons or up, down, right, and left cursor keys on the remote controller unit. Also, the user can select one bar region in the selected section bar by operating buttons or up, down, right, and left cursor keys on the remote controller unit.

The relationship between the face thumbnail display area and bellows thumbnail display area will be described below.

A set of face image display areas that belong to a single column, i.e., each individual column in the face thumbnail display area will be referred to as a "large section" hereinafter. Sections obtained by further dividing the large section will be referred to as "small sections" hereinafter. The number of small sections included in one large section is given by a quotient calculated by dividing the number of thumbnail images displayed on the bellows thumbnail display area by the number of columns of the face thumbnail display area. For example, if the face thumbnail display area is defined by 6 rows×16 columns, and the number of thumbnail images displayed on the bellows thumbnail display area is 240, the number of small sections included in one large section is 15 (=240÷16). One large section includes 15 small sections. In other words, 15 thumbnail images belong to a time zone corresponding to one large section.

When a certain thumbnail image on the bellows thumbnail display area is selected, the face image list display processing module 301 selects a column (large section), to which a time zone to which the selected thumbnail image belongs is assigned, of columns (large sections) in the face thumbnail display area based on the time stamp information of the selected thumbnail image. The large section to be selected is that including a section (small section) to which the selected thumbnail image belongs. The face image list display processing module 301 displays the selected large section with emphasis.

Furthermore, the face image list display processing module 301 displays a vertically elongated bar that connects the selected thumbnail image and the selected large section. This vertically elongated bar is used to present to which of the 15 small sections included in the selected large section a small section corresponding to the selected thumbnail image corresponds. The vertically elongated bar is displayed at the position of the small section corresponding to the selected thumbnail image of the 15 small sections included in the selected large section. For example, if the selected thumbnail image is a first image of 15 thumbnail images which belong to the time zone corresponding to a certain large section, i.e., an image corresponding to a first small section in the large section, the selected thumbnail image is connected to the left end of the large section by the vertically elongated bar. For example, if the selected thumbnail image is a last image of the 15 thumbnail images which belong to the time zone corresponding to a certain large section, i.e., an image corresponding to a last small section in the large section, the selected thumbnail image is connected to the right end of the large section by the vertically elongated bar.

As described above, when a thumbnail image on the bellows thumbnail display area is selected, a column (large section) to which a time zone to which the selected thumbnail image belongs is assigned is automatically selected from the columns in the face thumbnail display area. As a result, the user can identify to which column (large section) in the face thumbnail display area the selected thumbnail image corresponds. Furthermore, the user can also identify, based on the vertically elongated bar, to which column (large section) and timing the selected thumbnail image corresponds.

The face image list display processing module 301 also displays time information indicating the appearance timing of the selected thumbnail image on the indexing view screen based on the time stamp information of the selected thumbnail image.

A "present position change" button is used to change the selected thumbnail image. When the user operates a right or left cursor key while the "present position change" button is focused, a thumbnail image to be selected is moved to the right or left in increments of small sections.

Note that the indexing view screen has the preview window independently of the bellows thumbnail display area. Alternatively, the bellows thumbnail display area may serve as a preview window.

Figure 7:
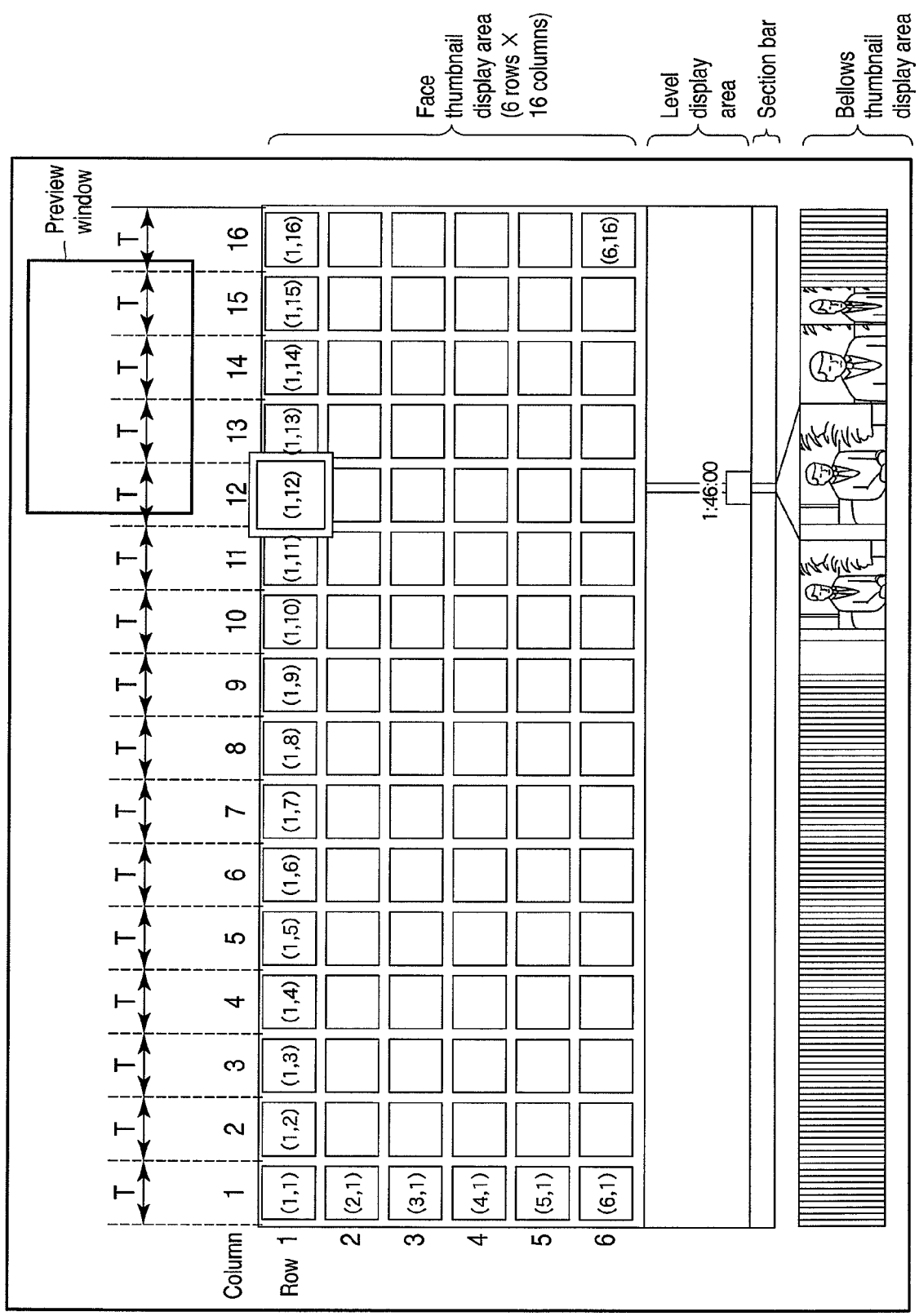
FIG. 7 is an exemplary view showing an example of the configuration of a face thumbnail display area included in the indexing view screen shown in FIG. 6.

FIG. 7 shows an example of the configuration of the face thumbnail display area.

The face thumbnail display area includes face image display areas laid out in a matrix including rows and columns. In FIG. 7, the face thumbnail display area is defined by 6 rows×16 columns. The number of face image display areas included in the face thumbnail display area is 96.

Time zones, which are determined by, e.g., equally dividing the total duration of video content data (moving image data included in the video content data) by the number of columns (=16) and each of which has an equal duration T, are respectively assigned to columns 1 to 16.

For example, if the total duration of video content data is 2 hours, the 2 hours are equally divided into 16 time zones. In this case, the duration T of each time zone is 7.5 minutes. For example, a time zone from (start) to 0:07:30 is assigned to column 1, a time zone from 0:07:30 to 0:15:00 is assigned to column 2, and a time zone from 0:15:00 to 0:22:30 is assigned to column 3. The duration T of each time zone is determined depending on the total duration of video content data.

Of course, the durations of time zones to be respectively assigned to columns need not always be equal to each other.

The face image list display processing module 301 displays face images which belong to a time zone assigned to each column on the six face image display areas in that column based on corresponding pieces of time stamp information of the face images extracted by the video processor 113 by laying them out in the aforementioned order of frequency of appearance or appearance time. In this case, the face image list display processing module 301 selects face images as many as the number of rows (6) in descending order of frequency of appearance from those which belong to a time zone assigned to a column to be displayed, and displays the selected face images as many as the number of rows by laying them out.

In this manner, the face thumbnail display area uses a time axis which has a left end position (1, 1) as a base point and a right end position (6, 16) as a terminal end of video content data.

The user can select the size of a face image to be displayed on each face image display area of the face thumbnail display area from "large", "middle", and "small". The numbers of rows and columns change depending on the size of a face image selected by the user. The relationship between the face image size and the numbers of rows and columns is as follows:
(1) In case of "large": 3 rows×8 columns
(2) In case of "middle": 6 rows×16 columns
(3) In case of "small": 10 rows×24 columns In case of "large", each face image is displayed to have a size of, for example, 180×180 pixels. In case of "middle", each face image is displayed to have a size of, for example, 90×90 pixels. In case of "small", each face image is displayed to have a size of, for example, 60×60 pixels. The default face image size is set to be, for example, "middle".

Each face image in the face thumbnail display area is set in one of two states, i.e., a "standard" state in which that face image is not selected, and a "focus" state in which that face image is selected. The size of a face image in the "focus" state is set to be larger than that (180×180, 90×90, or 60×60 pixels) in the "standard" state. FIG. 7 shows a case in which a face image at coordinates (1, 12) is in the "focus" state.

The number of thumbnail images displayed on the bellows thumbnail display area is set to be one of 240, 144, 96, and 48 according to a user's setting. The default number of thumbnail images is, for example, 240. In this case, moving image data is divided into 240 sections (240 time zones), and 240 thumbnail images respectively extracted from the 240 sections are displayed on the bellows thumbnail display area while being laid out in chronological order.

A thumbnail image is set in one of two states, i.e., a "standard" state in which that thumbnail image is not selected, and a "focus" state in which that thumbnail image is selected. A thumbnail image in the "focus" state is displayed to have a size larger than other thumbnail images.

The relationship between the preview window and face thumbnail display area will be described below with reference to FIGS. 8 to 11. FIGS. 8 to 11 illustrate only the preview window and face thumbnail display area on the indexing view screen for the sake of simplicity.

Figure 8:
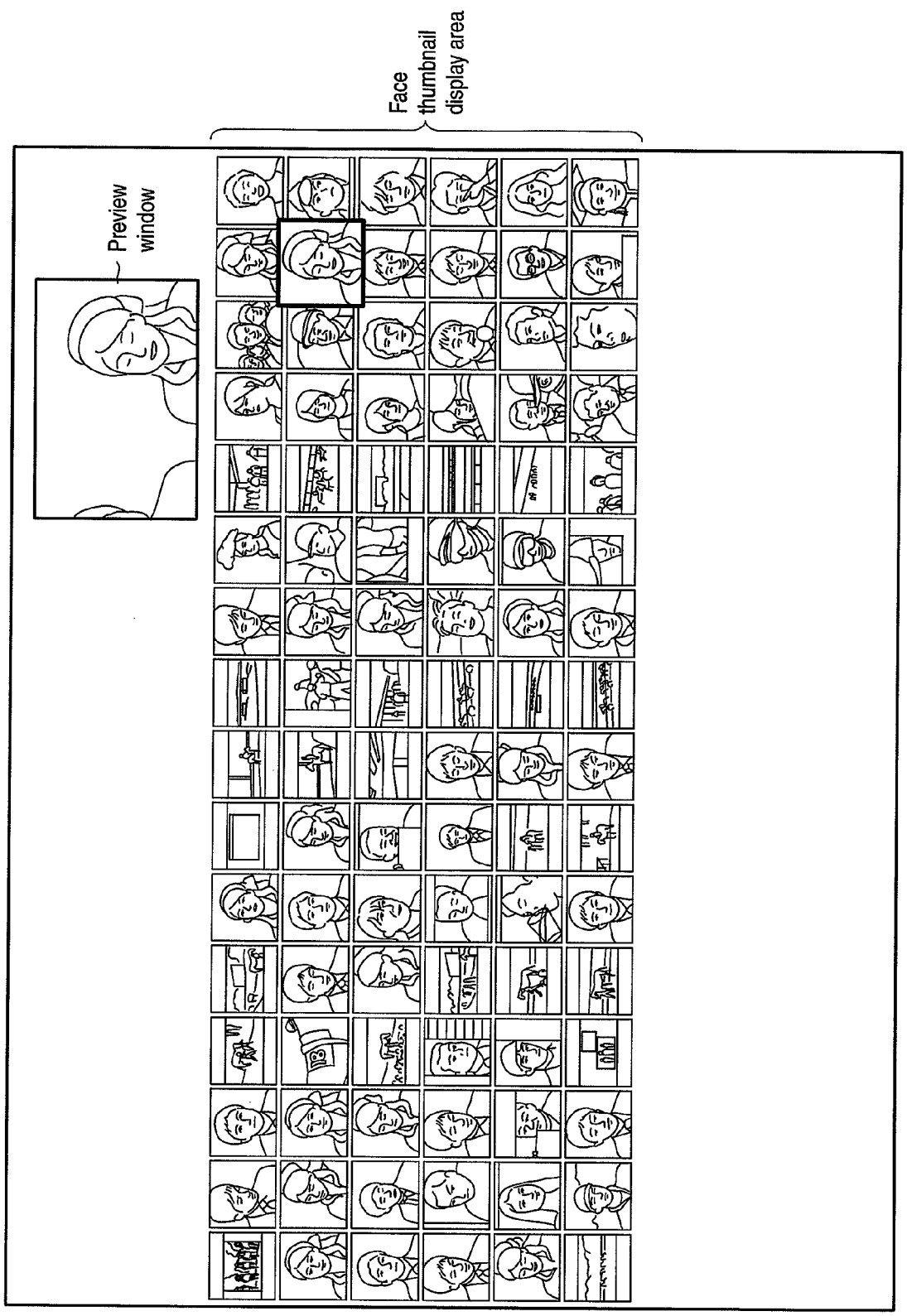
FIG. 8 is an exemplary view for explaining the relationship between the face thumbnail display area and a preview window included in the indexing view screen shown in FIG. 6.

On the indexing view screen shown in FIG. 8, the preview window displays a video frame corresponding to the playback position in video content data which is being played back. During playback of the video content data, for face images which appear in video frames within a predetermined period corresponding to the played-back video frame, a corresponding face image on the face thumbnail display area is displayed with emphasis (highlighted). This corresponding face image on the face thumbnail display area is displayed to have a size larger than other face images on the face thumbnail display area. In FIG. 8, the preview window displays a video frame including a female face image, and a face image on the face thumbnail display area corresponding to this female face image is displayed with emphasis to have a size larger than other face images. The face image to be displayed with emphasis on the face thumbnail display area is updated along with the progress of playback of the video content data on the preview window. That is, the face image to be displayed with emphasis is updated in correspondence with updating of the present playback position of the video content data.

Figure 9:
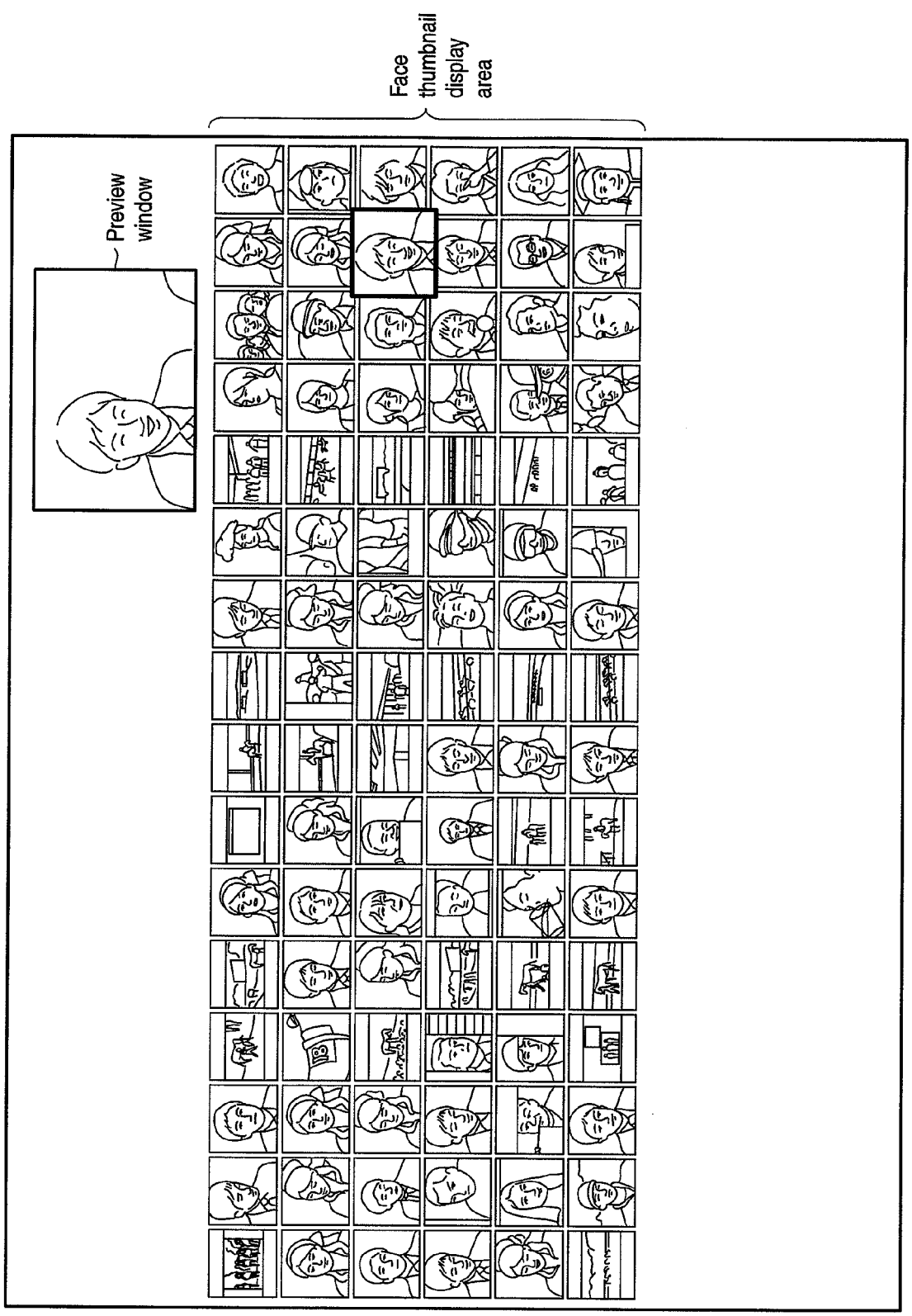
FIG. 9 is another exemplary view for explaining the relationship between the face thumbnail display area and preview window included in the indexing view screen shown in FIG. 6.

In FIG. 9, since the preview window is updated as a result of the progress of playback of the video content data, the preview window displays a video frame including a male face image. On the face thumbnail display area, a face image corresponding to the male face image on this preview window is displayed with emphasis to have a size larger than other face images, as in the case shown in FIG. 8.

With the aforementioned function, the user can easily recognize the correspondence between a video frame which is being played back on the preview window and a face image on the face thumbnail display area.

Note that as the period corresponding to the present playback position of video content data, a predetermined period including a video frame, which is being played back, in the video content data can be used. Note that the video frame which is being played back includes a face image of one person. However, a video frame may often include face images of two or more persons. On the face thumbnail display area as well, corresponding face images of two or more persons may be displayed with emphasis. When the number of video frames including a face image of the first person is small, face images corresponding two persons may be displayed with emphasis during a predetermined period from a video frame including a face image of the first person to a subsequent video frame including a face image of the second person.

Figure 10:
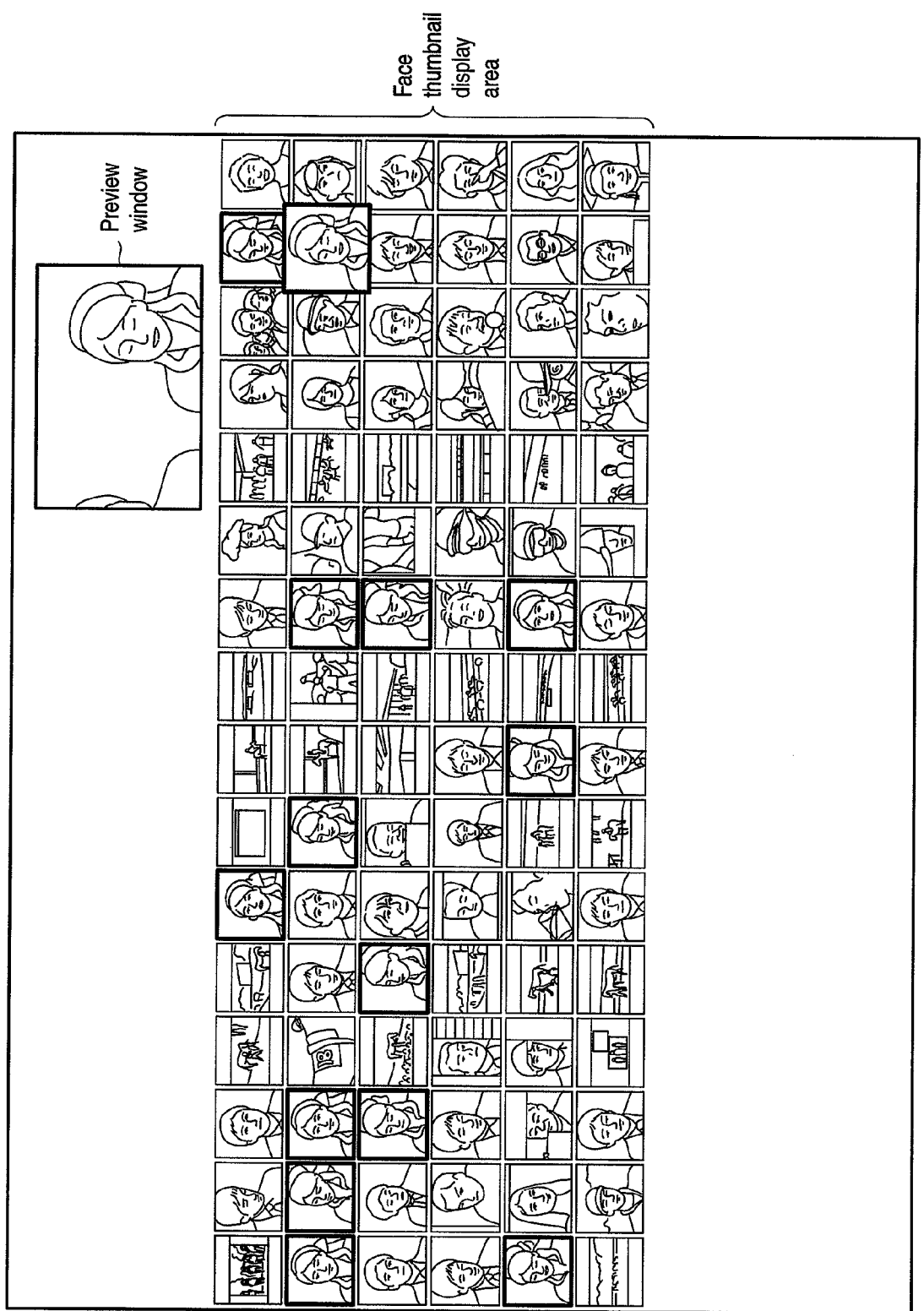
FIG. 10 is still another exemplary view for explaining the relationship between the face thumbnail display area and preview window included in the indexing view screen shown in FIG. 6.

The preview window in FIG. 10 displays a video frame including the same female face image as that on the preview window shown in FIG. 8. As in FIG. 8, a face image corresponding to the female face image on this preview window is displayed with emphasis to have a size larger than other images on the face thumbnail display area.

In addition, in FIG. 10, other face images on the face thumbnail display area, which are assigned the same ID as that assigned to the female face image on the preview window, are displayed with emphasis based on the IDs assigned upon classifying face images extracted from the video content data for respective persons. On the face thumbnail display area in FIG. 10, face images assigned the same ID are displayed with emphasis by bounding these face images by bold frames. That is, face images on the face thumbnail display area, which are estimated (classified) as the same person as the female displayed on the preview window, are displayed with emphasis by being bounded by bold frames.

As described above, since a face image corresponding to the present playback position is displayed with emphasis, and face images assigned the same ID as that of the emphasized face image are also displayed with emphasis, the user can recognize all scenes in which a person who appears on the preview window appears, and can easily perform a search or playback operation based on that person.

Figure 11:
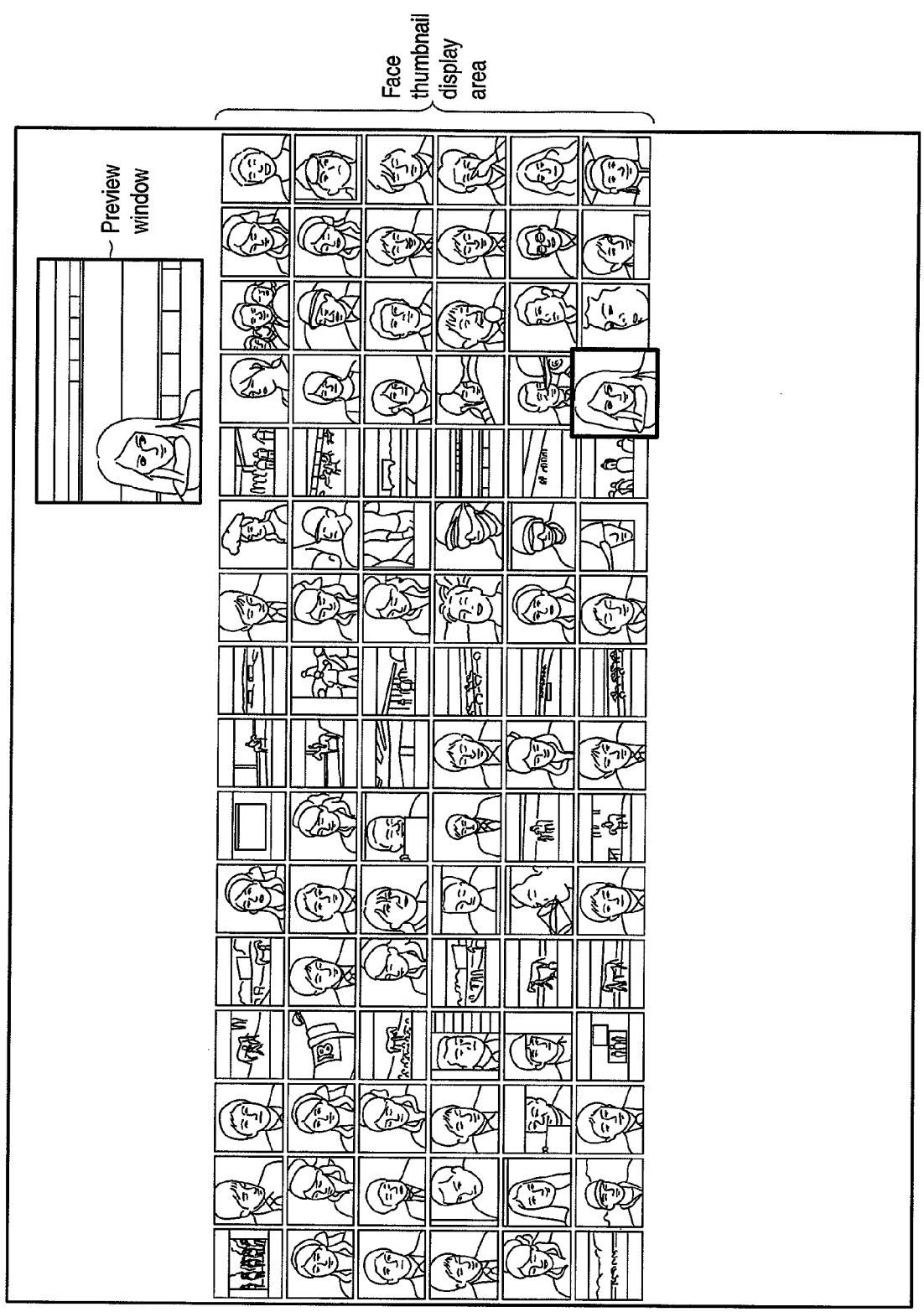
FIG. 11 is yet another exemplary view for explaining the relationship between the face thumbnail display area and preview window included in the indexing view screen shown in FIG. 6.

In FIG. 11, since the preview window is updated as a result of the progress of playback of the video content data, the preview window displays a video frame including another female face image. Since no face image corresponding to this female face image is displayed on the face thumbnail display area in FIG. 10, a face image corresponding to that displayed on the preview window cannot be presented to the user on the face thumbnail display area.

Hence, the face image list display processing module 301 extracts a face image corresponding to the present playback position of the video content data and time stamp information indicating its appearance time from face images which are extracted from the video content data and are stored in the database 111A. The face image list display processing module 301 newly displays the extracted face image with emphasis on a face image display area in a column of a corresponding time zone on the face thumbnail display area based on the extracted time stamp information. On the face thumbnail display area shown in FIG. 11, the face image corresponding to the female face image displayed on the preview window is newly displayed on the lowermost row of a column of a time zone corresponding to the time stamp information of this face image to have a size larger than other images. Upon displaying this face image, for example, like a popup display, highlighting with an animation (a face image displayed at the lower end of the screen slides to a predetermined position on the face thumbnail display area) may be made. In this case, the extracted face image is displayed on the lowermost row of the column. However, the row on which the extracted face image is to be displayed may be set as needed according to a use mode and the like. For example, when face thumbnail images are displayed in the order of frequency of appearance, the extracted face image may be displayed on the lowermost row of the corresponding column; when they are displayed in the order of appearance time, the extracted face image to be displayed may be inserted in a row corresponding to its appearance time.

With the aforementioned method, even when the face thumbnail display area does not include a face image corresponding to the present playback position displayed on the preview window, a corresponding face image is extracted from the database 111A, and is newly displayed with emphasis on the face thumbnail display area. Thus, the user can recognize the correspondence between a video frame which is being played back on the preview window and the face image on the face thumbnail display area.

Figure 12:
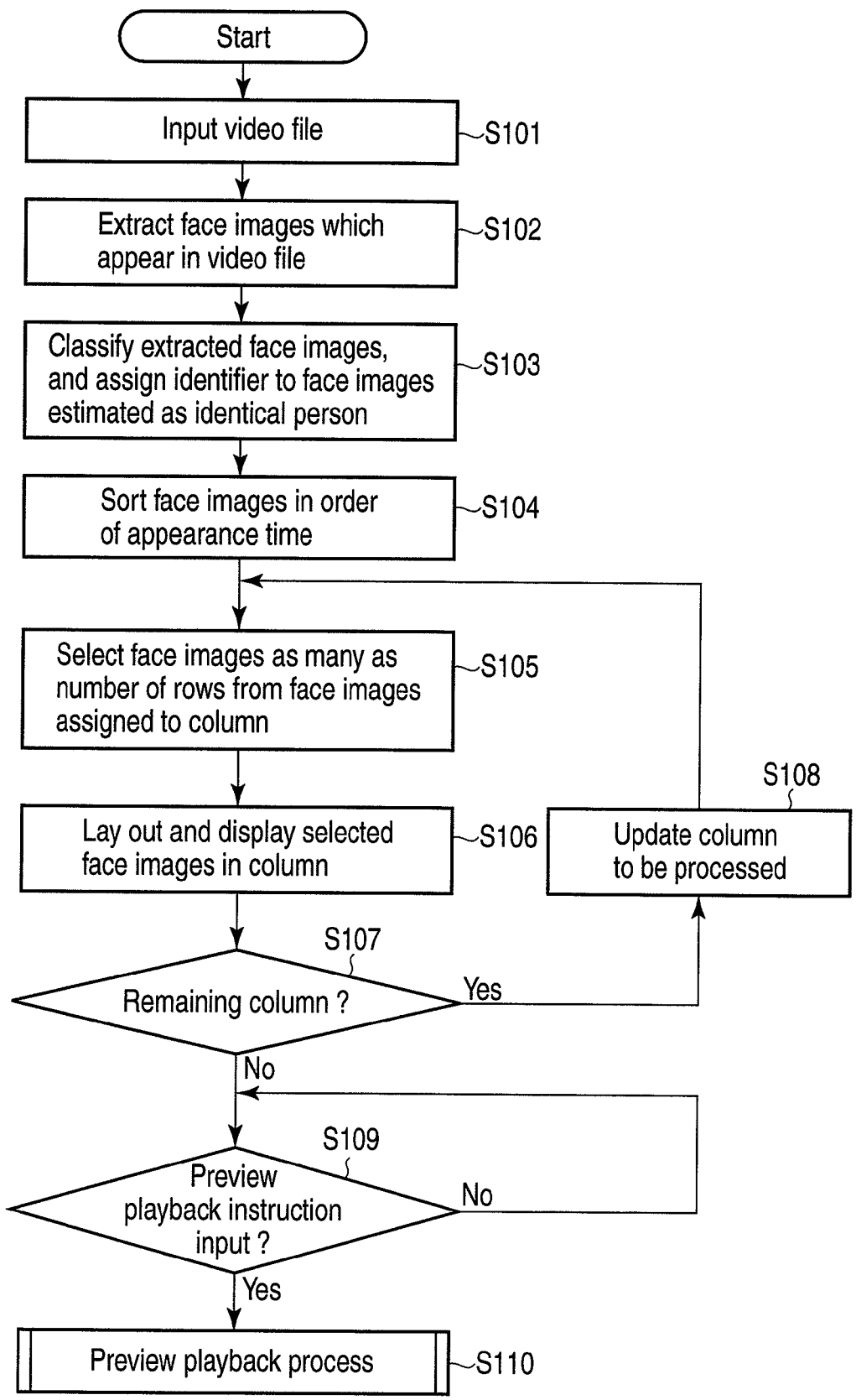
FIG. 12 is an exemplary flowchart showing an example of the procedures of an indexing process and face image display process executed by the electronic apparatus according to the embodiment.

The procedures of the indexing process and face image display process will be described below with reference to the flowchart shown in FIG. 12.

The recording processing module 401 extracts video content data (video data file) to be processed from a video input from the TV tuner 117 or an external apparatus, from video data stored in the HDD 111, or the like (block S101).

The video processor 113 controlled by the indexing control module 402 extracts face images from the video content data to be processed (block S102). The video processor 113 stores the face images in the database 111A of the HDD 111. The video processor 113 stores time stamp information (TS) of a frame from which each face image that belongs to the face images is extracted, and image size information of that face image in the database 111A.

Furthermore, the video processor 113 classifies the extracted face images and assigns an ID (face ID) to face images which belong to each of face images classified as an identical person (block S103). The video processor 113 stores the pieces of ID information of respective face images in the database 111A.

The face image list display processing module 301 sorts the face images stored in the database 111A in the order of appearance time of these face images based on pieces of time stamp information corresponding to these face images (block S104). The face image list display processing module 301 determines the numbers of rows and columns in accordance with a face image size to be displayed, which is designated by the user, and calculates a time zone to be assigned to each column (large section) by, e.g., equally dividing the total duration of the video content data to be indexed by the number of columns. The face image list display processing module 301 selects face images as many as the number of rows from those which belong to a time zone assigned to the column to be displayed (block S105). When the number of face images which belong to the time zone assigned to the column to be displayed is larger than the number of rows, the face image list display processing module 301 may execute, for example, a process for preferentially selecting face images with higher frequencies of appearance.

In this case, the face image list display processing module 301 preferentially selects face images with higher frequencies of appearance in the time zone from those which belong to the time zone assigned to the column to be displayed. When the number of face images which belong to the time zone assigned to the column to be displayed is larger than the number of rows, the face image list display processing module 301 may execute a process for preferentially selecting face images with larger sizes from those which belong to the time zone assigned to the column to be displayed based on the size information of each of the face images stored in the database 111A.

A face image extracted from a frame including a closeup face shot has a relatively large size. Therefore, a face image is more likely to include a person with higher importance as the size of the extracted face image is larger. Hence, by preferentially selecting face images with larger sizes, face images of persons with higher importance can be preferentially displayed.

The face image list display processing module 301 displays the selected face images on the face image display areas in the column to be displayed by laying them out in, e.g., the order of frequency of appearance or appearance time (block S106). A face image with a higher frequency of appearance or earlier appearance time is displayed on the upper face image display area.

The processes in blocks S105 and S106 are repetitively executed while updating the number of the column to be displayed until the processing for all the columns is complete (blocks S107 and S108). As a result, face images are laid out and displayed on the face image display areas.

When the number of face images which belong to a time zone assigned to the column to be displayed is smaller than the number of rows, thumbnail images that belong to the corresponding time zone may be displayed on the column to be displayed.

Upon completion of the processing for all the columns (NO in block S107), the playback processing module 403 determines if the user inputs a playback instruction (block S109). If the user inputs a playback instruction (YES in block S109), the process for playing back moving image data in the video content data and displaying it on the preview window, and the process for displaying face images with emphasis (highlighting face images), which appear within a period corresponding to the present playback position of the moving image data displayed on the preview window, on the face image display areas are executed (block S110).

FIG. 13 is a flowchart showing the procedures of the process for displaying a face image that appears in a video frame displayed on the preview window with emphasis on the face image display area. The process for displaying a corresponding face image with emphasis on the face image display area is executed by the emphasizing processing module 404 of the face image list display processing module 301 in accordance with the process for updating a video frame to be displayed on the preview window upon playing back video content data.

The emphasizing processing module 404 determines if video content data to be processed is being played back, i.e., if a video frame which is being played back is displayed on the preview window (block S201). If the video content data to be processed is being played back (YES in block S201), the emphasizing processing module 404 determines if there are face images, which are extracted from video frames within a predetermined period including the present playback position and are stored in the database 111A (block S202). That is, the emphasizing processing module 404 determines if a face image appears in each video frame which belongs to video frames within the predetermined period including the present playback position.

If the face image appears in the video frames within the predetermined period including the present playback position (YES in block S202), the emphasizing processing module 404 determines if the face image which appears in the video frames is displayed on the face thumbnail display area (block S203). If the face image which appears in the video frames is displayed on the face thumbnail display area (YES in block S203), the emphasizing processing module 404 displays a face image on the face thumbnail display area corresponding to the face image that appears in the video frames with emphasis (block S204). If the face image which appears in the video frames is not displayed on the face thumbnail display area (NO in block S203), the emphasizing processing module 404 extracts a face image corresponding to the face image that appears in the video frames and its time stamp information from the database 111A, and displays the extracted face image with emphasis at a corresponding position on the face thumbnail display area (block S205). The extracted face image is displayed on a column of the corresponding time zone on the face thumbnail display area based on its time stamp information.

The emphasizing processing module 404 acquires an ID assigned to the face image that appears in the video frames from the database 111A (block S206). Then, the emphasizing processing module 404 displays each face image which belong to face images assigned the same ID as the acquired ID with emphasis on the face thumbnail display area (block S207).

The emphasizing processing module 404 repetitively executes the aforementioned processes (blocks S201 to S207) during the playback period of the video content data.

With the processes described with reference to the flowcharts shown in FIGS. 12 and 13, a video frame which is being played back is displayed on the preview window, and a face image which appears within a predetermined period including that video frame can be displayed with emphasis on the face thumbnail display area during playback of video content data. As a result, the user can easily recognize correspondence between the video frame which is being played back on the preview window and the face image on the face thumbnail display area.

As described above, according to this embodiment, displaying of a corresponding face image on the face thumbnail display area with emphasis can be updated in cooperation with playback of video data displayed on the preview window. As a result, since the user recognizes correspondence between a video frame which is being played back on the preview window and a face image on the face thumbnail display area as needed, he or she can easily perform operations such as selection and playback of a scene focused on a person who appears in that video frame.

In this embodiment, the video processor 113 serving as the indexing processing module generates the indexing information. For example, when broadcast program data includes indexing information corresponding to that broadcast program data in advance, the indexing process is not required. Hence, the thumbnail image display function and preview playback function of this embodiment can also be implemented by only the database 111A and indexing viewer program (face image list display processing module 301 and playback processing module 403).

Since both the face image list display function and playback function of this embodiment can be implemented by software, the same effects as in this embodiment can be easily implemented by introducing this software to a normal computer via a computer-readable storage medium.

Furthermore, the electronic apparatus of this embodiment can be implemented not only by the computer 10 but also by, for example, various consumer electronic apparatuses such as an HDD recorder, DVD recorder, and television apparatus. In this case, the thumbnail image display function and preview playback function can be implemented by hardware such as a DSP or microcomputer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
one or more processors configured to extract face images which appear in a sequence of moving image data in video content data, and to output time stamp information indicating a time of appearance of each of the extracted face images on the sequence of the moving image data; display the extracted face images on a first display area on a display screen, the first display area comprising face image display areas arranged in a matrix including rows and columns, time segments in a total duration of the moving image data being assigned to the columns, the extracted face images being arranged on the columns assigned the time segments to which the time stamp information of the extracted face images belong; play back the moving image data and to display the moving image data on a second display area on the display screen; and display a first face image on the first display area with emphasis which appears within a time period corresponding to a playback position of the moving image data based on the time stamp information corresponding to each of the extracted face images, when the moving image data is played on the second display area.

2. The apparatus of claim 1, wherein the one or more processors is configured to classify the extracted face image, and to assign an identifier to face images classified as an identical person, and to display other face images on the first display area with emphasis which are assigned the same identifier as the identifier of the first face image.

3. The apparatus of claim 2, wherein the one or more processors is configured to update face images to be displayed with emphasis on the first display area along with progress of playback of the moving image data.

4. The apparatus of claim 1, wherein the one or more processors is configured to select a predetermined number of face images from face images which belong to each time segment, and to display the predetermined number of selected face images on the face image display areas of the corresponding column on the first display area, and to extract a face image which appears within the time period from the extracted face images, and to display the extracted face image on the face image display area of the corresponding column on the first display area with emphasis when the face image which appears within the time period is not displayed on the first display area.

5. An electronic apparatus comprising:
one or more processors configured to extract face images which appear in a sequence of moving image data in video content data, to output time stamp information indicating a time of appearance of each of the extracted face images on the sequence of the moving image data, to classify the extracted face images, and to assign an identifier to face images classified as an identical person;

select a predetermined number of face images which belong to each of time segments in an order of frequency of appearance based on the identifiers assigned to the extracted face images from the extracted face images and to display the predetermined number of the selected face images on a first display area on a display screen, the first display area comprising face image display areas arranged in a matrix including rows and columns, time segments in a total duration of the moving image data being assigned to the columns, the predetermined number of the selected face images being arranged on the image display areas of the corresponding columns in the first display area; play back the moving image data and to display the moving image data on a second display area on the display screen; and display a first face image which appears within the time period corresponding to a playback position of the moving image, and other face images which are assigned the same identifier as the identifier of the first face image, on the first display area with emphasis based on the time stamp information corresponding to the extracted face images, when the moving image data is played on the second display area.

6. The apparatus of claim 5, wherein the one or more processors is configured to extract a face image which appears within the time period from the extracted face images, and to display the extracted face image on the face image display area of the corresponding column on the first display area with emphasis when the first face image which appears within the time period is not displayed on the first display area.

7. A video processing method comprising:
using one or more processors for extracting face images which appear in a sequence of moving image data in video content data, and
outputting time stamp information indicating a time of appearance of each of the extracted face images on the sequence of the moving image data;
displaying the extracted face images on a first display area on a display screen, the first display area comprising face image display areas arranged in a matrix including rows and columns, time segments in a total duration of the moving image data being assigned to the columns, the extracted face images being arranged on the columns assigned the time segments to which the time stamp information of the extracted face images belong;
playing back the moving image data and displaying the moving image data on a second display area on the display screen; and
displaying a first face image on the first display area with emphasis which appears within the time period corresponding to a playback position of the moving image data, based on the time stamp information corresponding to each of the extracted face image, when the moving image data is played on the second display area.

8. The method of claim 7, wherein
the extracting and outputting comprise classifying the extracted face images, and assigning an identifier to face images classified as an identical person; and
the displaying comprises displaying other face images on the first display area with emphasis which are assigned the same identifier as the identifier of the first face image.

* * * * *